United States Patent
Ravi et al.

(10) Patent No.: US 6,560,462 B1
(45) Date of Patent: May 6, 2003

(54) SYSTEM AND METHOD FOR DETERMINING THE LOCATION OF A MOBILE STATION IN A WIRELESS NETWORK

(75) Inventors: Shobha C. Ravi, Richardson, TX (US); Muhammad K. Shafi, Richardson, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/521,542

(22) Filed: Mar. 7, 2000

(51) Int. Cl.⁷ .............................................. H04Q 7/20
(52) U.S. Cl. ................... 455/456; 455/404; 455/522; 455/423
(58) Field of Search ........................... 455/404, 456, 455/522, 64, 423

(56) References Cited

U.S. PATENT DOCUMENTS

| | | | | |
|---|---|---|---|---|
| 5,887,245 A | * | 3/1999 | Lindroth et al. | 455/69 |
| 5,945,948 A | * | 8/1999 | Buford et al. | 342/457 |
| 5,974,057 A | * | 10/1999 | Rozanski, Jr. et al. | 370/519 |
| 6,006,113 A | * | 12/1999 | Meredith | 455/562 |
| 6,108,315 A | * | 8/2000 | Freeburg et al. | 370/310 |
| 6,167,275 A | * | 12/2000 | Ores et al. | 455/456 |
| 6,275,186 B1 | * | 8/2001 | Kong | 342/363 |
| 6,438,381 B1 | * | 8/2002 | Alberth et al. | 455/456 |
| 6,484,031 B1 | * | 11/2002 | Ruutu et al. | 455/456 |

* cited by examiner

*Primary Examiner*—Lee Nguyen
*Assistant Examiner*—Danh Le (57) ABSTRACT

There is disclosed a mobile station locating system for use in a wireless network comprising a group of base stations that communicate with mobile stations. The mobile station locating system comprises: 1) a timer for measuring a first round trip delay time between a position locator message transmitted from the first base station to the first mobile station and a position locator acknowledgment message transmitted from the first mobile station back to the first base station; 2) a power monitor for measuring a power level of the position locator acknowledgment message received by the first base station and determining that the received power level has saturated a receiver in the first base station; and 3) a data processor coupled to the timer and to the power monitor that causes the first base station to transmit power control messages to the first mobile station. The power control messages cause the first mobile station to increase the transmission power level of the position locator acknowledgment message. The increased transmission power level cause the receiver to saturate. The data processor, in response to a determination that the first base station receiver has saturated, calculates from the first round trip delay time a first distance between the first mobile station and the first base station.

21 Claims, 4 Drawing Sheets

SYSTEM AND METHOD FOR DETERMINING THE LOCATION OF A MOBILE STATION IN A WIRELESS NETWORK

TECHNICAL FIELD OF THE INVENTION

The present invention is directed, in general, to wireless networks and, more specifically, to a system for locating a mobile station in wireless network.

BACKGROUND OF THE INVENTION

Reliable predictions indicate that there will be over 300 million cellular telephone customers worldwide by the year 2000. Within the United States, cellular service is offered by cellular service providers, by the regional Bell companies, and by the national long distance operators. The enhanced competition has driven the price of cellular service down to the point where it is affordable to a large segment of the population.

The current generation of cellular phones is used primarily for voice conversations between a party using a subscriber handset (i.e., a wireless mobile station) and another party through the wireless network. A smaller number of wireless mobile stations are data devices, such as personal computers (PCs) equipped with cellular/wireless modems. Because the bandwidth for a current generation wireless mobile station is typically limited to a few tens of kilobits per second (Kbps), the applications for the current generation of wireless mobile stations are relatively limited.

However, this is expected to change in the next (or third) generation of cellular/wireless technology, sometimes referred to as "3G" cellular/wireless, where a much greater bandwidth will be available to each wireless mobile station (e.g., 125 Kbps or greater). The higher data rates will make Internet applications for wireless mobile stations much more common, including web browser applications, streaming audio and/or video applications, and the like.

The 3G wireless systems will also provide a number of new services and features that either are not available or are rarely available in conventional wireless networks. These new features of 3G wireless systems include position location capabilities that may be used to determine the location of a wireless mobile station. In some instances, position location capabilities will be mandated by law. For example, the Federal Communications Commission (FCC) has mandated that 3G wireless networks must be able to determine the location of a mobile station making an emergency call (e.g., E-911 call).

A number of conventional techniques have been used to determine the location of wireless mobile stations. These prior art techniques include: Time of Arrival (TOA), Angle of Arrival (AOA), and Time Difference of Arrival. Some conventional position location systems combine two or more of these techniques, such as TOA/AOA and TDOA/AOA. Also, a mobile station may include a global positioning system (GPS) device that determines the location of the mobile station and transmits this position information to the wireless network.

However, each of the prior art systems has numerous drawbacks. In a TOA position locating system, all mobile stations serviced by the network must be able to calculate highly accurate mobile station processing times. Also, TOA position locating systems are susceptible to timing errors caused by multiple signal reflections and require a minimum of three base station receivers to perform triangulation. AOA position locating systems require a minimum of three base station receivers equipped with multi-array antennas to perform triangulation. These multi-array antennas are expensive and replace conventional antenna arrays. TDOA position locating systems also require a minimum of three base station receivers. However, if the mobile station is too close to one base station receiver, it is usually out of the listening range of the other two base stations. GPS-based systems increase the cost of the wireless handset and are dependent on a line-of-sight to the GPS satellites.

Therefore, there is a need in the art for improved systems and methods for locating a mobile station. In particular, there is a need in the art for improved systems and methods for accurately locating a mobile station that has placed an emergency (or 911) call. More particularly, there is a need in the art for improved systems and methods for accurately locating a mobile station that do not require costly multi-array antennas.

SUMMARY OF THE INVENTION

To address the above-discussed deficiencies of the prior art, it is a primary object of the present invention to provide, for use in a wireless network comprising a plurality of base stations capable of communicating with a plurality of mobile stations, a mobile station locating system associated with a first one of the plurality of base stations for determining the location of a first one of the plurality of mobile stations. In an advantageous embodiment of the present invention, the mobile station position locating system comprises: 1) a timer capable of measuring a first round trip delay time associated with a position locator message transmitted from the first base station to the first mobile station and a position locator acknowledgment message transmitted from the first mobile station back to the first base station; 2) a power monitor capable of measuring a power level of the position locator acknowledgment message received by the first base station and determining that the received power level has saturated a receiver associated with the first base station; and 3) a data processor coupled to the timer and to the power monitor capable of causing the first base station to transmit at least one power control message to the first mobile station capable of causing the first mobile station to increase a transmission power level of the position locator acknowledgment message, the increased transmission power level causing the receiver to saturate, wherein the data processor, in response to a determination that the first base station receiver has saturated, calculates from the first round trip delay time a first distance between the first mobile station and the first base station.

According to one embodiment of the present invention, the data processor, in response to the determination that the receiver has saturated, transmits a first position location command to a selected second one of the plurality of base stations, wherein the first position location command is capable of causing a second mobile station locating system associated with the selected second base station to calculate a second distance between the first mobile station and the selected second base station.

According to another embodiment of the present invention, the selected second base station transmits the second distance to the data processor in the first base station and wherein the data processor determines from the first distance and the second distance the location of the first mobile station.

According to still another embodiment of the present invention, the data processor, in response to the determination that the receiver has saturated, transmits a second position location command to a selected third one of the plurality of base stations, wherein the second position location command is capable of causing a third mobile station locating system associated with the selected third base station to calculate a third distance between the first mobile station and the selected third base station.

According to yet another embodiment of the present invention, the selected third base station transmits the third distance to the data processor in the first base station and wherein the data processor determines from the first distance, the second distance, and the third distance, the location of the first mobile station.

According to a further embodiment of the present invention, the first base station comprises a sectored antenna capable of receiving the position locator acknowledgment message in a plurality of antenna sectors, and wherein the data processor is capable of determining a first of the plurality of antenna sectors that is most strongly receiving the position locator acknowledgment message.

According to still further embodiment of the present invention, the data processor is capable of determining from the first antenna sector a general direction of the first mobile station with respect to the first base station.

According to a yet further embodiment of the present invention, the data processor selects the selected second base station and selects the selected third base station based on the general direction of the first mobile station.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
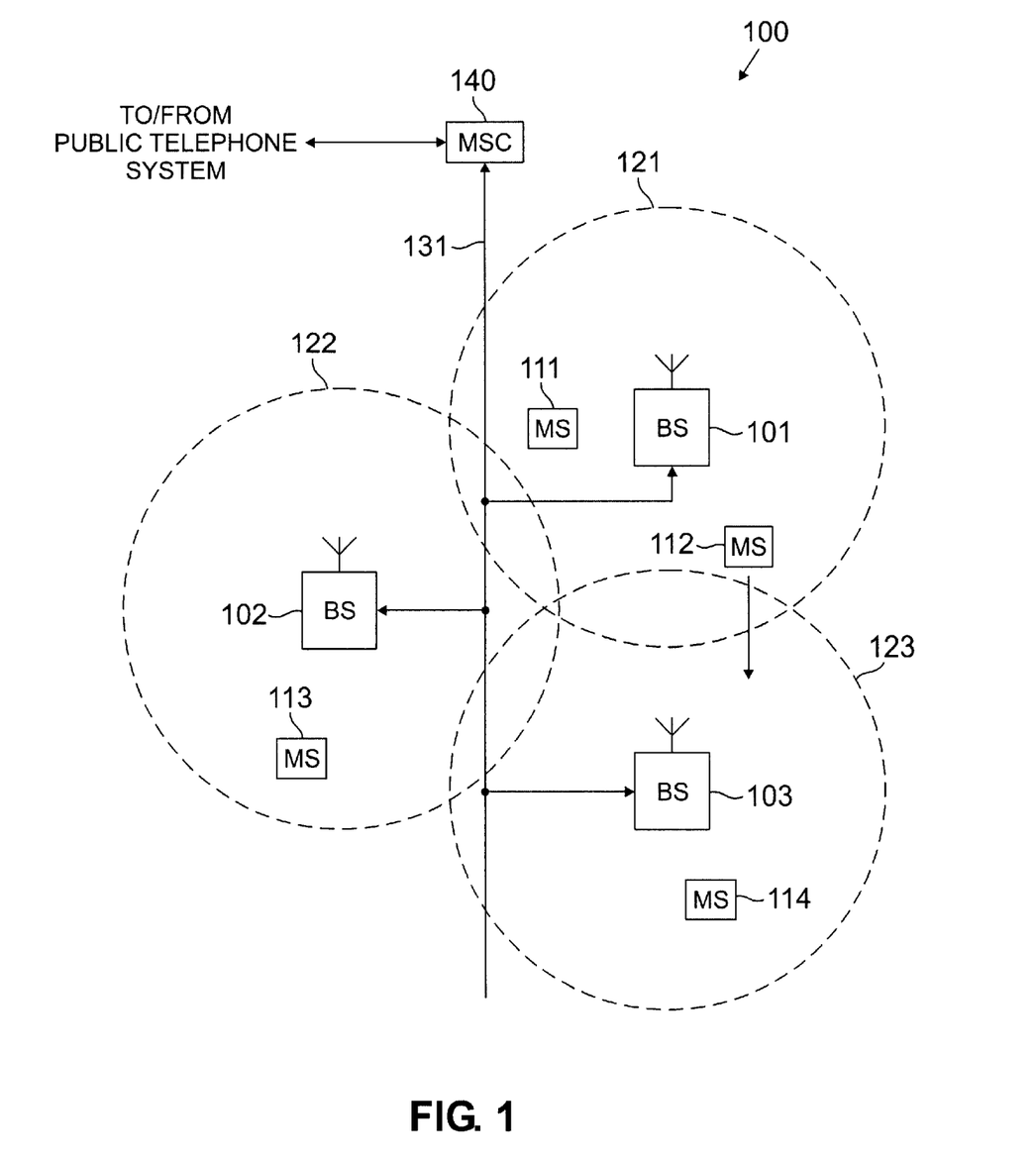
FIG. 1 illustrates a general overview of an exemplary wireless network according to one embodiment of the present invention.

FIG. 1 illustrates a general overview of exemplary wireless network 100 according to one embodiment of the present invention. Wireless network 100 comprises a plurality of cell sites 121–123, each containing one of the base stations, BS 101, BS 102, or BS 103. Base stations 101–103 are operable to communicate with a plurality of mobile stations (MS) 111–114. Mobile stations 111–114 may be any suitable wireless communication devices, including conventional cellular telephones, PCS handset devices, portable computers, telemetry devices, and the like.

Dotted lines show the approximate boundaries of the cell sites 121–123 in which base stations 101–103 are located. The cell sites are shown approximately circular for the purposes of illustration and explanation only. It should be clearly understood that the cell sites also may have irregular shapes, depending on the cell configuration selected and natural and man-made obstructions.

In one embodiment of the present invention, BS 101, BS 102, and BS 103 may comprise a base station controller (BSC) and a base transceiver station (BTS). Base station controllers and base transceiver stations are well known to those skilled in the art. A base station controller is a device that manages wireless communications resources, including the base transceiver station, for specified cells within a wireless communications network. A base transceiver station comprises the RF transceivers, antennas, and other electrical equipment located in each cell site. This equipment may include air conditioning units, heating units, electrical supplies, telephone line interfaces, and RF transmitters and RF receivers, as well as call processing circuitry. For the purpose of simplicity and clarity in explaining the operation of the present invention, the base transceiver station in each of cells 121, 122, and 123 and the base station controller associated with each base transceiver station are collectively represented by BS 101, BS 102 and BS 103, respectively.

BS 101, BS 102 and BS 103 transfer voice and data signals between each other and the public telephone system (not shown) via communications line 131 and mobile switching center (MSC) 140. Mobile switching center 140 is well known to those skilled in the art. Mobile switching center 140 is a switching device that provides services and coordination between the subscribers in a wireless network and external networks, such as the public telephone system and/or the Internet. Communications line 131 may be any suitable connection means, including a T1 line, a T3 line, a fiber optic link, a network backbone connection, and the like. In some embodiments of the present invention, communications line 131 may be several different data links, where each data link couples one of BS 101, BS 102, or BS 103 to MSC 140.

In the exemplary wireless network 100, MS 111 is located in cell site 121 and is in communication with BS 101, MS 113 is located in cell site 122 and is in communication with BS 102, and MS 114 is located in cell site 123 and is in communication with BS 103. MS 112 is also located in cell site 121, close to the edge of cell site 123. The direction arrow proximate MS 112 indicates the movement of MS 112 towards cell site 123. At some point, as MS 112 moves into cell site 123 and out of cell site 121, a "handoff" will occur.

As is well known, the "handoff" procedure transfers control of a call from a first cell to a second cell. For example, if MS 112 is in communication with BS 101 and senses that the signal from BS 101 is becoming unacceptably weak, MS 112 may then switch to a BS that has a stronger signal, such as the signal transmitted by BS 103. MS 112 and BS 103 establish a new communication link and a signal is sent to BS 101 and the public telephone network to transfer the on-going voice, data, or control signals through BS 103. The call is thereby seamlessly transferred from BS 101 to BS 103. An "idle" handoff is a handoff between cells of a mobile device that is communicating in the control or paging channel, rather than transmitting voice and/or data signals in the regular traffic channels.

Figure 2:
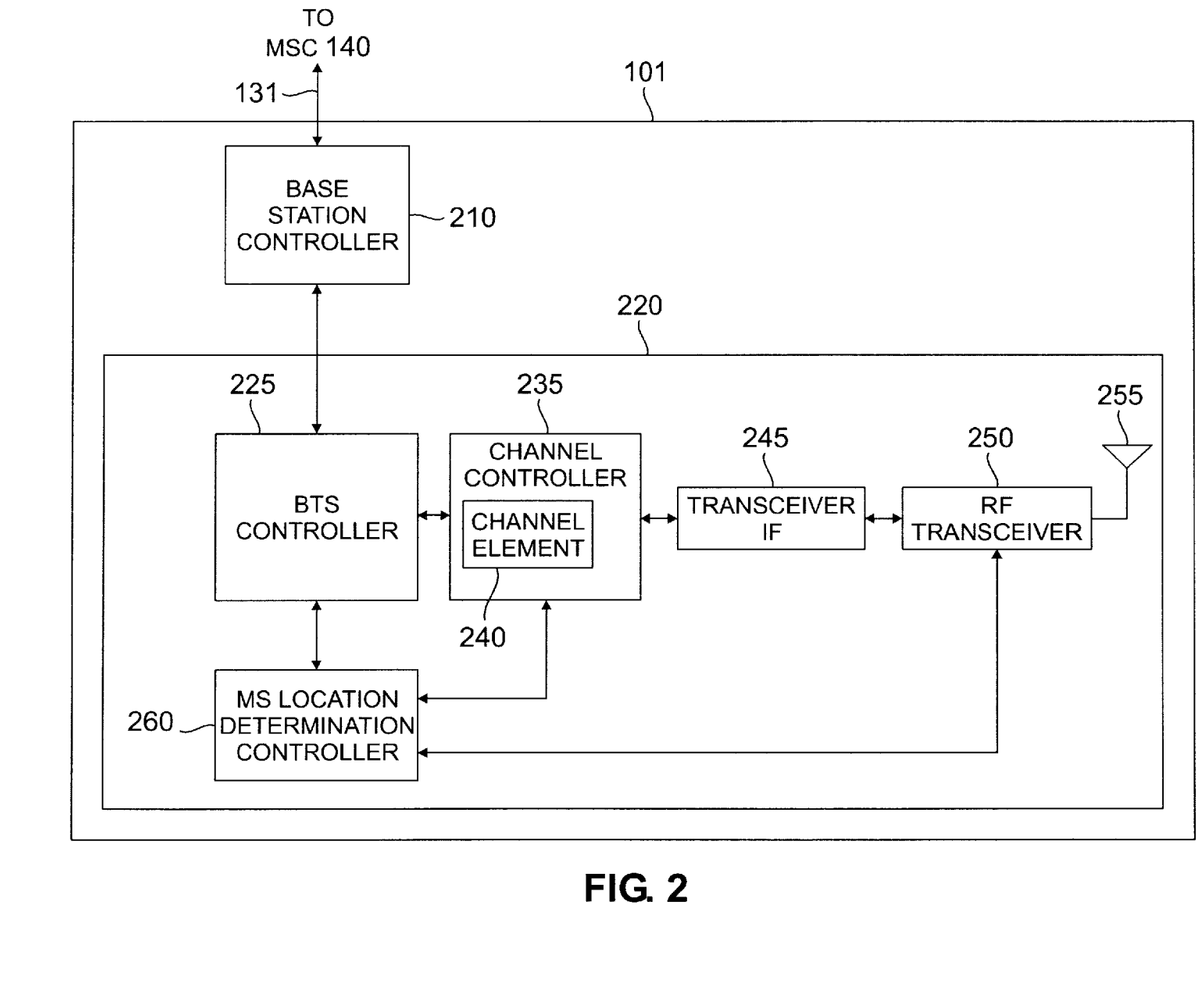
FIG. 2 illustrates in greater detail an exemplary base station in accordance with one embodiment of the present invention.

FIG. 2 illustrates in greater detail exemplary base station 101 in accordance with one embodiment of the present invention. Base station 101 comprises base station controller (BSC) 210 and base transceiver station (BTS) 220. Base station controllers and base transceiver stations were described previously in connection with FIG. 1. BSC 210 manages the resources in cell site 121, including BTS 220. BTS 220 comprises BTS controller 225, channel controller 235, which contains representative channel element 240, transceiver interface (IF) 245, RF transceiver unit 250, antenna array 255 and mobile station (MS) location determination controller 260.

BTS controller 225 comprises processing circuitry and memory capable of executing an operating program that controls the overall operation of BTS 220 and communicates with BSC 210. Under normal conditions, BTS controller 225 directs the operation of channel controller 235, which contains a number of channel elements, including channel element 240, that perform bi-directional communications in the forward channel and the reverse channel. A "forward" channel refers to outbound signals from the base station to the mobile station and a "reverse" channel refers to inbound signals from the mobile station to the base station. In an advantageous embodiment of the present invention, the channel elements operate according to a code division multiple access (CDMA) protocol with the mobile stations in cell 121. Transceiver IF 245 transfers the bi-directional channel signals between channel controller 240 and RF transceiver unit 250.

MS location determination controller 260 in conjunction with circuitry located in RF transceiver 250 and channel controller 235 controls the transmit power (i.e., reverse channel power) of a selected mobile station (in this case, MS 112) and calculates the distance between BS 101 and MS 112. Ultimately, MS location determination controller 260 uses the distance that it calculated and one or more distances calculated by other base stations, such as BS 102 and BS 103, to determine the position of MS 112.

Antenna array 255 transmits forward channel signals from RF transceiver unit 250 to mobile stations in the coverage area of BS 101. Antenna array 255 also sends to transceiver 250 reverse channel signals received from mobile stations in the coverage area of BS 101. In a preferred embodiment of the present invention, antenna array 255 is multi-sector antenna, such as a three sector antenna in which each antenna sector is responsible for transmitting and receiving in a 120° arc of coverage area. Additionally, RF transceiver 250 may contain an antenna selection unit to select among different antennas in antenna array 255 during both transmit and receive operations. As will be explained below in greater detail, when MS location determination controller 260 is determining the location of MS 112, MS location determination controller 260 may determine the antenna sector that is receiving the strongest signal from MS 112 in order to select other base stations that also will calculate a distance to MS 112.

MS location determination controller 260 may determine the location of MS 112 in response to any number of events, including the initiation of an emergency (e.g., 911) call from MS 112, a request received from MS 112 that may have been initiated by an application being executed by MS 112, a control message received from some device in wireless network 100, such as a network maintenance application executed by a network server, and the like.

Figure 3:
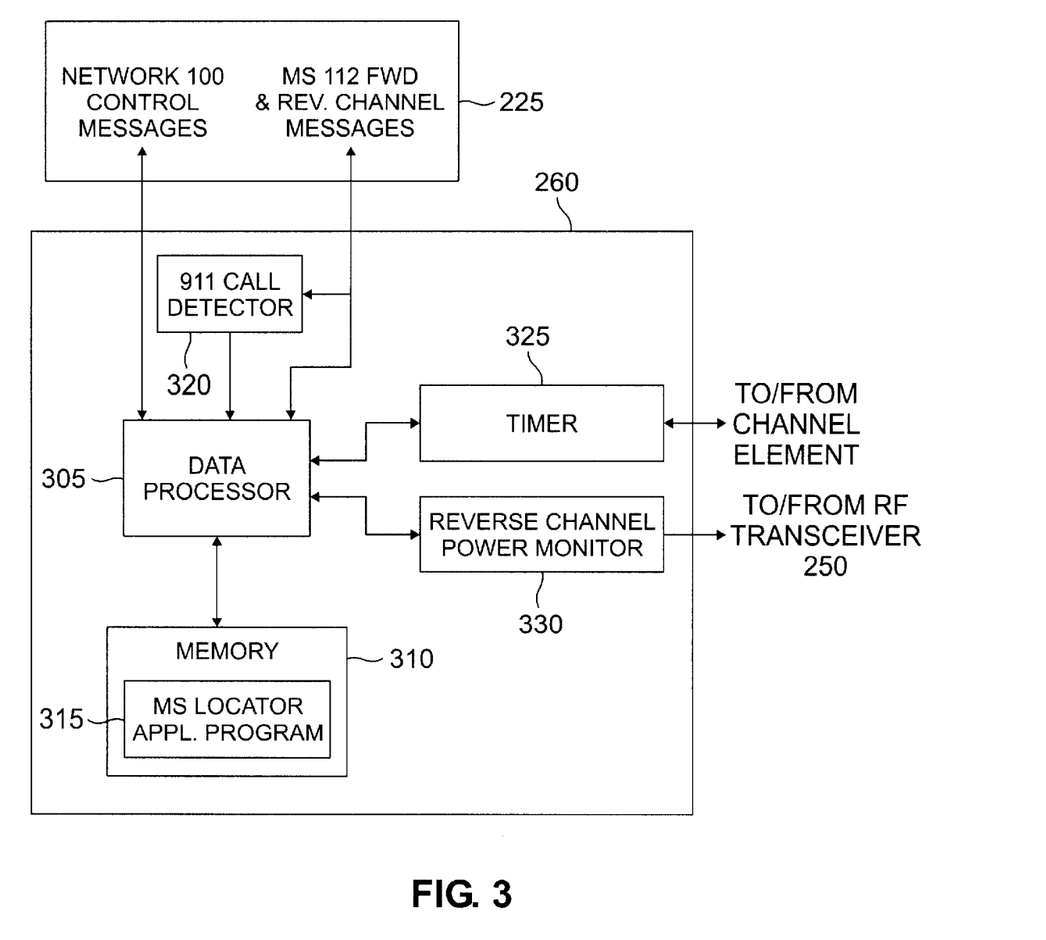
FIG. 3 illustrates an exemplary mobile station location determination controller in accordance with one embodiment of the present invention.

FIG. 3 illustrates exemplary mobile station (MS) location determination controller 260 in accordance with one embodiment of the present invention. MS location determination controller 260 comprises data processor 305, memory 310, which stores MS locator application program 315, 911 call detector 320, timer 325, and reverse channel power monitor 330.

Data processor 305 comprises processing circuitry that executes MS locator application program 315, which controls the operation of the various elements of MS location determination controller 260 and coordinates communications with other base stations in network 100 through BTS controller 225.

Data processor 305 communicates with 911 call detector 320 to determine if any 911 calls are being handled in cell site 121 and to identify the mobile station associated with those calls. 911 call detector 920 monitors forward channel traffic from mobile stations, including MS 112, received through BTS controller 225, and detects 911 calls in the forward channel traffic. 911 call detector 920 then correlates each detected 911 call with the mobile station that originated the 911 call and communicate the correlated 911 call and mobile station identification information to data processor 305.

To calculate the distance to a mobile station that has made an emergency call (in this case, MS 112), data processor 305 transmits to MS 112 a position locator message. MS 112 is configured to respond instantaneously to this message by transmitting back to data processor 305 a position locator acknowledgment message. Timer 325 calculates the round trip delay from the transmission of the position locator message from BS 101 to the reception by BS 101 of the position locator acknowledgment message.

For instance, timer 325 may start counting when the channel element that communicates with MS 112 transmits the position locator message in the forward channel and may stop counting when the channel element that communicates with MS 112 receives the position locator acknowledgment message in the reverse channel. The round trip delay measured by timer 325 may be adjusted to account for the known signal processing delays in MS 112 and in transceiver IF 245 and RF transceiver 250. The adjusted round trip delay represents the combined transmission time (or "flight time") of the position locator message and the position locator acknowledgment message. Dividing the adjusted round trip delay by two gives the transmission time in a single direction. The single direction transmission time may be used to calculate the distance, D1, between BS 101 and MS 112. The distance D1 defines a circle of radius D1 with BS 101 at the center of the circle. If this process is repeated for at least one other base station, the intersection points of the circles determines the location of MS 112.

When calculating the distance to a mobile station that has made an emergency call (i.e., MS 112), data processor 305 first increases the transmitter power of MS 112 in order to ensure that MS 112 can be received by neighboring base stations near BS 101. Reverse channel power monitor 330 monitors the reverse channel power level in the receiver portion of BS 101. In an exemplary embodiment of the present invention, reverse channel power monitor 330 monitors the automatic gain control (AGC) in the receiver portion of RF transceiver 250 to detect when the receiver portion becomes saturated as a result of the reverse channel power level output by a particular mobile station (e.g., MS 112). Reverse channel power monitor 330 communicates the monitored power levels, including point of saturation, to data processor 305. In turn, data processor 305 may report power levels for informational purposes, as well as for use in evaluating when the power level of MS 112 has saturated the receiver in BS 101.

Figure 4:
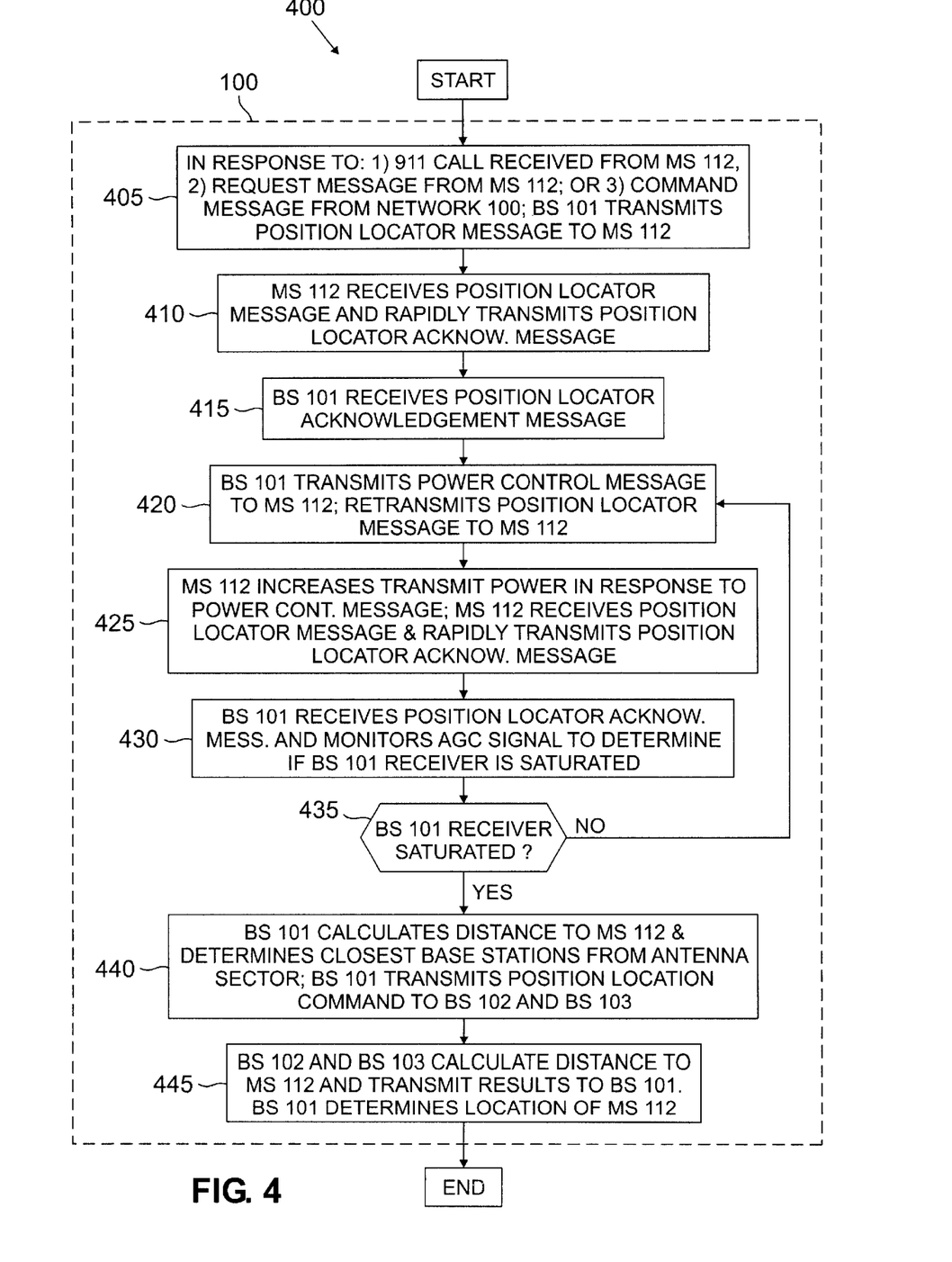
FIG. 4 depicts flow chart 400, which illustrates the operation of exemplary mobile station (MS) location determination controller 260 in network 100 according to one embodiment of the present invention.

FIG. 4 depicts flow chart 400, which illustrates the operation of exemplary mobile station (MS) location determination controller 260 in network 100 according to one embodiment of the present invention. MS location determination controller 260 determines the position of MS 112 in response to: 1) the detection of a 911 call from MS 112, 2) receipt of a position request message from MS 112, or 3) receipt of a command from wireless network 100 to locate MS 112. In response to one of these events, MS location determination controller 260 causes BS 101 to transmit a position locator message in a forward channel to MS 112 (process step 405).

MS 112 receives the position locator message and rapidly transmits a position locator acknowledgment (acknow.) message in the reverse channel (process step 410). BS 101 receives the position locator acknowledgment message from MS 112 and transfers it to MS location determination controller 260 (process step 415).

Next, MS location determination controller 260 causes BS 101 to transmit a power control message to MS 112 that causes MS 112 to increase its transmission power. MS location determination controller 260 also retransmits the position locator message to MS 112 (process step 420). MS 112 increases its transmit power in response to the power control message. MS 112 also receives the retransmitted position locator message and, in response, transmits another position locator acknowledgment message (at higher power) to BS 101 (process step 425).

BS 101 receives the position locator acknowledgment message from MS 112 and reverse channel power monitor 330 measures the automatic gain control (AGC) level associated with the received position locator acknowledgment message. Data processor 305 examines the measured AGC level from reverse channel power monitor 330 to determine if the receiver portion of RF transceiver 250 is saturated by the power level of the position locator acknowledgment message from MS 112 (process step 430).

If data processor 305 determines that the receiver in BS 101 is not saturated by the position locator acknowledgment message from MS 112, MS locator determination controller 260 causes BS 101 to transmit another power control message (which causes MS 112 to increase its transmission power) and to transmit another position locator message. The process of increasing and measuring the power level of the position locator acknowledgment messages received from MS 112 continues until the receiver portion of RF transceiver 250 is saturated by the position locator acknowledgment message from MS 112 (process steps 435 and 420, 425, and 430).

When the receiver portion of BS 101 is saturated, data processor 305 calculates the distance, D1, from BS 101 to MS 112 using the round trip delay time measured by timer 325, as described above. Next, data processor 305 or reverse channel power monitor 330 may determine which antenna sector of antenna array 255 is receiving the highest level of reverse channel power from MS 112. The antenna sector receiving the strongest reverse channel signal gives the general direction of MS 112 with respect to BS 101. Once this general direction is known, data processor 305 can determine the relative closeness of MS 112 to other base stations in wireless network 100. For example, data processor 305 may determine that MS 112 lies in the general direction of BS 102 and BS 103. In response to this determination, BS 101 transmits position location command messages to BS 102 and BS 103 (process step 440).

When BS 102 and BS 103 receive the position location command message from BS 101, each of BS 102 and BS 103 independently calculates the distance between itself and MS 112 by transmitting a new position locator message and measuring the round trip delay for the corresponding position locator acknowledgment message, as previously described. The distances, D2 and D3, calculated by BS 102 and BS 103 respectively, are then transmitted to BS 101. Data processor 305 uses the distances D1, D2, and D3 to determine the position of MS 112 using well known triangulation techniques (process step 445).

Although the present invention has been described in detail, those skilled in the art should understand that they can make various changes, substitutions and alterations herein without departing from the spirit and scope of the invention in its broadest form.

What is claimed is:

1. For use in a wireless network comprising a plurality of base stations capable of communicating with a plurality of mobile stations, a mobile station locating system associated with a first one of said plurality of base stations for determining the location of a first one of said plurality of mobile stations, said mobile station position locating system comprising:

a timer capable of measuring a first round trip delay time associated with a position locator message transmitted from said first base station to said first mobile station and a position locator acknowledgment message transmitted from said first mobile station back to said first base station;

a power monitor capable of measuring a power level of said position locator acknowledgment message received by said first base station and determining that said received power level has saturated a receiver associated with said first base station; and a data processor coupled to said timer and to said power monitor capable of causing said first base station to transmit at least one power control message to said first mobile station capable of causing said first mobile station to increase a transmission power level of said position locator acknowledgment message, said increased transmission power level causing said receiver to saturate, wherein said data processor, in response to a determination that said first base station receiver has saturated, calculates from said first round trip delay time a first distance between said first mobile station and said first base station.

2. The mobile station locating system as set forth in claim 1 wherein said data processor, in response to said determination that said receiver has saturated, transmits a first position location command to a selected second one of said plurality of base stations, wherein said first position location command is capable of causing a second mobile station locating system associated with said selected second base station to calculate a second distance between said first mobile station and said selected second base station.

3. The mobile station locating system as set forth in claim 2 wherein said selected second base station transmits said second distance to said data processor in said first base station and wherein said data processor determines from said first distance and said second distance the location of said first mobile station.

4. The mobile station locating system as set forth in claim 3 wherein said data processor, in response to said determination that said receiver has saturated, transmits a second position location command to a selected third one of said plurality of base stations, wherein said second position location command is capable of causing a third mobile station locating system associated with said selected third base station to calculate a third distance between said first mobile station and said selected third base station.

5. The mobile station locating system as set forth in claim 4 wherein said selected third base station transmits said third distance to said data processor in said first base station and wherein said data processor determines from said first distance, said second distance, and said third distance, the location of said first mobile station.

6. The mobile station locating system as set forth in claim 5 wherein said first base station comprises a sectored antenna capable of receiving said position locator acknowledgment message in a plurality of antenna sectors, and wherein said data processor is capable of determining a first of said plurality of antenna sectors that is most strongly receiving said position locator acknowledgment message.

7. The mobile station locating system as set forth in claim 6 wherein said data processor is capable of determining from said first antenna sector a general direction of said first mobile station with respect to said first base station.

8. The mobile station locating system as set forth in claim 7 wherein said data processor selects said selected second base station and selects said selected third base station based on said general direction of said first mobile station.

9. A wireless network comprising a plurality of base stations capable of communicating with a plurality of mobile stations, wherein a first one of said plurality of base stations comprises:

a mobile station locating system capable of determining the location of a first one of said plurality of mobile stations, said mobile station position locating system comprising:

a timer capable of measuring a first round trip delay time associated with a position locator message transmitted from said first base station to said first mobile station and a position locator acknowledgment message transmitted from said first mobile station back to said first base station;

a power monitor capable of measuring a power level of said position locator acknowledgment message received by said first base station and determining that said received power level has saturated a receiver associated with said first base station; and a data processor coupled to said timer and to said power monitor capable of causing said first base station to transmit at least one power control message to said first mobile station capable of causing said first mobile station to increase a transmission power level of said position locator acknowledgment message, said increased transmission power level causing said receiver to saturate, wherein said data processor, in response to a determination that said first base station receiver has saturated, calculates from said first round trip delay time a first distance between said first mobile station and said first base station.

10. The wireless network as set forth in claim 9 wherein said data processor, in response to said determination that said receiver has saturated, transmits a first position location command to a selected second one of said plurality of base stations, wherein said first position location command is capable of causing a second mobile station locating system associated with said selected second base station to calculate a second distance between said first mobile station and said selected second base station.

11. The wireless network as set forth in claim 10 wherein said selected second base station transmits said second distance to said data processor in said first base station and wherein said data processor determines from said first distance and said second distance the location of said first mobile station.

12. The wireless network as set forth in claim 11 wherein said data processor, in response to said determination that said receiver has saturated, transmits a second position location command to a selected third one of said plurality of base stations, wherein said second position location command is capable of causing a third mobile station locating system associated with said selected third base station to calculate a third distance between said first mobile station and said selected third base station.

13. The wireless network as set forth in claim 12 wherein said selected third base station transmits said third distance to said data processor in said first base station and wherein said data processor determines from said first distance, said second distance, and said third distance, the location of said first mobile station.

14. The wireless network as set forth in claim 13 wherein said first base station comprises a sectored antenna capable of receiving said position locator acknowledgment message in a plurality of antenna sectors, and wherein said data processor is capable of determining a first of said plurality of antenna sectors that is most strongly receiving said position locator acknowledgment message.

15. The wireless network as set forth in claim 14 wherein said data processor is capable of determining from said first antenna sector a general direction of said first mobile station with respect to said first base station.

16. The wireless network as set forth in claim 15 wherein said data processor selects said selected second base station and selects said selected third base station based on said general direction of said first mobile station.

17. For use in a wireless network comprising a plurality of base stations capable of communicating with a plurality of mobile stations, a method of determining the location of a first one of the plurality of mobile stations comprising the steps of:

transmitting to the first mobile station from a first one of the base stations a plurality of position locator messages, wherein the plurality of position locator messages causes the first mobile station to transmit to the first base station a plurality of position locator acknowledgment messages;

transmitting to the first mobile station a plurality of power control messages, wherein the plurality of power control messages causes the first mobile station to transmit the plurality of position locator acknowledgment messages at progressively increasing levels of transmission power;

determining that at least one of the position locator acknowledgment messages received by the first base station has saturated a receiver in the first base station; and     in response to the determination that at least one of the position locator acknowledgment messages has saturated the receiver, measuring a first round trip delay time associated with a first position locator message and a first position locator acknowledgment message responding to the first position locator message; and     calculating from the first round trip delay time a first distance between the first mobile station and the first base station.

18. The method as set forth in claim 17 further comprising the step of calculating a second distance between the first mobile station and a selected second base station, the step of calculating a second distance comprising:

transmitting to the first mobile station from a second one of the base stations a position locator message, wherein the position locator message causes the first mobile station to transmit to the second base station a position locator acknowledgment message;

measuring a second round trip delay time associated with the position locator message and the position locator acknowledgment message responding to the position locator message; and     calculating from the second round trip delay time a second distance between the first mobile station and the second base station.

19. The method as set forth in claim 18 further comprising the step of determining from the first distance and the second distance the location of the first mobile station.

20. The method as set forth in claim 19 further comprising the step of calculating a third distance between the first mobile station and a selected third base station, the step of calculating a third distance comprising:

transmitting to the first mobile station from a third one of the base stations a position locator message, wherein the position locator message causes the first mobile station to transmit to the third base station a position locator acknowledgment message;

measuring a third round trip delay time associated with the position locator message and the position locator acknowledgment message responding to the position locator message; and     calculating from the third round trip delay time a third distance between the first mobile station and the third base station.

21. The method as set forth in claim 20 further comprising the step of determining from the first distance, the second distance, and the third distance, the location of the first mobile station.

\* \* \* \* \*